United States Patent Office 3,558,723
Patented Jan. 26, 1971

3,558,723
HIGH TEMPERATURE CHLORINATION OF DIBROMODIFLUOROMETHANE
Ralph A. Davis, Midland, and Ronald G. Tigner, North Bradley, Mich., assignors to The Dow Chemical Company, Midland, Mich., a corporation of Delaware
No Drawing. Filed June 9, 1969, Ser. No. 831,763
Int. Cl. C07c 17/10, 19/08
U.S. Cl. 260—653                      12 Claims

ABSTRACT OF THE DISCLOSURE

Disclosed is a process for converting dibromodifluoromethane to bromochlorodifluoromethane and dichlorodifluoromethane. Dibromodifluoromethane is reacted with chlorine or hydrogen chloride at temperatures within the range of from about 400° to 900° C. Unexpectedly, the foregoing reaction does not result in the disproportionation of the halogenated starting material. The process provides an efficient means for recovering the halogen values of undesired or excess products from other manufacturing processes.

BACKGROUND OF THE INVENTION

Bromochlorodifluoromethane is a well known refrigerant. Its boiling point of about −4° C. makes it especially desirable for this purpose due to the relative ease with which it can be liquefied. It is also an excellent fire extinguishing composition.

U.S. Pat. No. 2,731,505 discloses that $CBrClF_2$ can be prepared by the bromination of chlorodifluoromethane. The product of this process consists of a mixture of $CBrClF_2$ and $CBr_2F_2$ with $CBr_2F_2$ comprising from about 5 to 30 percent of the mixture. These compounds can readily be separated by distillation since their boiling points are −4° and 22° C., respectively. Although both compounds are useful as fire extinguishing compositions, $CBrClF_2$ is preferred over $CBr_2F_2$ because it is substantially less toxic.

It is often desirable to recover the bromine and fluorine values of the $CBr_2F_2$ for use in the preparation of additional $CClBrF_2$. One recovery method involves burning $CBr_2F_2$ in a high temperature gas flame, absorbing the HBr and HF products in water, neutralizing the solution with $Na_2CO_3$ to form NaBr and NaF and precipitating $CaF_2$ by the addition of $CaCl_2$.

A preferred method of recovering the bromine and fluorine values in the $CBr_2F_2$ would be to replace either one or both of its bromine atoms with chlorine to form a desired perhalomethane.

Accordingly, it is an object of the present invention to provide a novel process for the chlorination of dibromodifluoromethane.

Another object is to provide a process for the preparation of bromochlorodifluoromethane and dichlorodifluoromethane.

An additional object is to provide such a process which may be employed to recover the bromine and fluorine values of dibromodifluoromethane by converting it to bromochlorodifluoromethane and dichlorodifluoromethane.

SUMMARY OF THE INVENTION

The present invention is a process for the preparation of bromochlorodifluoromethane and dichlorodifluoromethane by the chlorination of dibromodifluoromethane. The chlorination is carried out by reacting $CBr_2F_2$ with chlorine or hydrogen chloride at a temperature within the range of from 400° to 900° C.

This process unexpectedly converts the $CBr_2F_2$ into $CBrClF_2$ and $CCl_2F_2$ without the usual disproportionation which accompanies high temperature treatment of other perhalomethanes.

DETAILED DESCRIPTION OF THE INVENTION

The present chlorination of dibromodifluoromethane is carried out at a reaction tempearture of from 400° to 900° C. with the preferred temperature range being from 450° to 650° C. The reaction time, i.e., the average time that a unit quantity of reactants are in contact is normally from about 0.5 to 30 seconds with 2 to 10 seconds being preferred. The reaction time necessary for substantial conversion will vary inversely with the reaction temperature, e.g., 0.5 second at 650° C. and 10 seconds at 450° C., will result in substantial conversion.

While the ratio of reactants is not critical, a concentration which provides about 0.8 to 5 moles of $CBr_2F_2$ per mole of $Cl_2$ or HCl is generally employed in the chlorination. Maximum yields of $CBrClF_2$ are obtained by using from about 2 to 3 moles of $CBr_2F_2$ per mole of HCl. Lower concentrations of $CBr_2F_2$ result in greater conversion to $CCl_2F_2$.

Depending upon the reaction conditions employed, the process of the present invention results in conversion of up to greater than 50 percent of the $CBr_2F_2$ starting material into $CBrClF_2$ and about 5 to 18 percent conversion into $CCl_2F_2$. The $CCl_2F_2$ coproduced is useful as a refrigerant and aerosol propellant.

The invention is normally practiced by feeding dibromodifluoromethane gas into a heated reaction zone along with chlorine, hydrogen chloride or a mixture thereof. While the reaction will proceed without any packing in the reaction zone, it is preferred that the reactor be packed with a heat transfer material. Suitable packing materials for the reactor include particulate graphite, $CaF_2$ or MgO. Nickel, glass or alumina rings may also be employed as heat transfer agents.

Since the boiling points of the products, $CBrClF_2$ and $CCl_2F_2$, and unreacted starting material, $CBr_2F_2$, are −4°, −30° and 22° C. respectively, these three compounds are readily separated by distillation. The excess bromine values, generally in the form of $Br_2$, ClBr or HBr, can be separated from the gas stream by absorption in caustic solution and recovered as the bromide salt.

The present invention is further illustrated by the following examples.

EXAMPLE I

Dibromodifluoromethane, 419 gm. (1.995 M), and chlorine, 62 gm. (0.873 M), giving a mole ratio of 2.29:1 were metered through a ¾ inch by 30 inch glass reactor tube packed with ¼ inch glass rings. The reactor and rings were made of a high temperature glass consisting of greater than about 90 percent silica and having a softening point of about 1500° C. and a temperature limit in service of approximately 900° C. Sufficient external heat was applied to maintain the temperature of the reaction zone at 550° C. as estimated by determining the temperature of the outside of the tube with a thermocouple. The residence time of the reactants in the heated zone was about 3.2 seconds.

The exit gases were scrubbed with a sodium carbonate solution, dried over calcium chloride and condensed in a Dry Ice cooled trap. The weight of the material recovered from the Dry Ice trap was 348 grams. The carbonate scrubber was analyzed for bromine and chlorine.

The material recovered from the Dry Ice trap was analyzed by gas liquid chromatography and the percent conversion calculated as $$\left[ \frac{\text{moles product}}{\text{moles } CBr_2F_2 \text{ fed}} \right]$$

The results of the analysis and determination of conversions are as follows:

|  | Weight percent of material recovered | Moles recovered | Conversion, percent |
|---|---|---|---|
| $CCl_2F_2$ | 8.37 | 0.239 | 12.0 |
| $CBrClF_2$ | 47.95 | 1.01 | 50.6 |
| Recovered $CBr_2F_2$ | 43.65 | 0.721 | 36.1 |
| Total |  | 1.97 | Unreacted |

Organic recovery was calculated as $$\frac{\text{total moles recovered}}{\text{moles } CBr_2F_2 \text{ fed}}, \text{i.e.,} \frac{1.97}{1.995}$$

and determined to be 98.7 percent.

The total bromine recovery calculated as $$\left[\frac{\text{moles } Br_2 \text{ in products} + \text{moles } Br_2 \text{ in HBr}}{\text{moles } CBr_2F_2 \text{ charged}}\right]$$

was determined to be 95 percent. The amount of unreacted chlorine found in the scrubber was 0.015 M or 1.7 percent of the chlorine charged.

EXAMPLE II

In a manner similar to Example I $CBr_2F_2$ and HCl were reacted in a mole ratio of 1.08:1.0. The reactor temperature was 600° C. and the residence time of the reactants in the reactor was 4.6 seconds. Analysis of the product showed that there was a 1.48 percent conversion to $CCl_2F_2$, a 40.01 percent conversion to $CBrClF_2$ with 45.28 percent of the $CBr_2F_2$ remaining unreacted. The organic recovery was 86.77 percent and the total bromine recover 98.0 percent.

What is claimed it:

1. A process which comprises contacting dibromodifluoromethane with chlorine or hydrogen chloride at a temperature of from 400° to 900° C.

2. The process of claim 1 wherein the reactants are contacted for a time of from 0.5 to 30 seconds.

3. The process of claim 1 wherein the temperature is from 450° to 650° C.

4. The process of claim 3 wherein the reactants are contacted for a time of from 2 to 10 seconds.

5. The process of claim 1 wherein dibromodifluoromethane is reacted with chlorine and the molar ratio of dibromodifluoromethane to chlorine is from 2:1 to 3:1.

6. The process of claim 1 wherein dibromodifluoromethane is reacted with hydrogen chloride and the molar ratio of dibromodifluoromethane to hydrogen chloride is from 0.8:1 to 2:1.

7. The process of claim 1 wherein the reactants are contacted in the presence of a heat transfer material.

8. A process for the preparation of bromochlorodifluoromethane which comprises contacting dibromodifluoromethane with chlorine or hydrogen chloride at a temperature of from 400° to 900° C. for a period of from 0.5 to 30 seconds.

9. The process of claim 8 wherein the dibromodifluoromethane is contacted with chlorine and the molar ratio of dibromodifluoromethane to chlorine is from 2:1 to 3:1.

10. The process of claim 8 wherein the dibromodifluoromethane is contacted with hydrogen chloride and the molar ratio of dibromodifluoromethane to hydrogen chloride is from 0.8:1 to 2:1.

11. The process of claim 8 wherein the reactants are contacted at a temperature of from 450° to 650° C. for a period of from 2 to 10 seconds.

12. The process of claim 8 wherein the reactants are contacted in the presence of a heat transfer material.

References Cited

UNITED STATES PATENTS 2,639,302   5/1953   Ruh et al.

DANIEL D. HORWITZ, Primary Examiner